United States Patent [19]

Tomiyasu

[11] Patent Number: 5,138,305
[45] Date of Patent: Aug. 11, 1992

[54] DISPLAY CONTROLLER

[75] Inventor: Yuichi Tomiyasu, Higashimurayama, Japan

[73] Assignee: Kabushiki Kaisha Toshiba, Kawasaki, Japan

[21] Appl. No.: 329,707

[22] Filed: Mar. 28, 1989

[30] Foreign Application Priority Data

Mar. 30, 1988 [JP] Japan ................................. 63-76928

[51] Int. Cl.5 ............................................. G09G 3/02
[52] U.S. Cl. ..................................... 340/717; 340/814
[58] Field of Search ............... 340/717, 716, 701, 703, 340/720, 711, 784, 814

[56] References Cited

U.S. PATENT DOCUMENTS

| | | | |
|---|---|---|---|
| 4,574,279 | 3/1986 | Roberts | 340/731 |
| 4,684,942 | 8/1987 | Nishi et al. | 340/701 |
| 4,760,387 | 7/1988 | Ishii et al. | 340/717 |
| 4,841,289 | 6/1989 | Kambayashi et al. | 340/703 |
| 4,918,436 | 4/1990 | Joary | 340/703 |
| 4,926,166 | 5/1990 | Fujisawa et al. | 340/717 |

FOREIGN PATENT DOCUMENTS

0120428  6/1985  Japan ................................. 340/717

Primary Examiner—Alvin E. Oberley
Assistant Examiner—Xiao Min Wu
Attorney, Agent, or Firm—Finnegan, Henderson, Farabow, Garrett and Dunner

[57] ABSTRACT

A CRT display unit and a flat panel type display unit are switched for use in a computer system. Both the CRT display unit and the flat panel type display unit display an image stored in an image memory in accordance with display parameters set in an I/O register. A parameter memory stores a set of display parameters for each of display modes of the CRT display unit and the flat display unit. When switching between the display units is requested via a keyboard, transfer control means transfers display parameters for the newly designated display unit from the parameter memory to the I/O register. A display circuit causes the newly designated display unit to display an image in accordance with the display parameters stored in the I/O register and the image data.

22 Claims, 7 Drawing Sheets

|  | C R T | L C D | E L D |
|---|---|---|---|
| FLT<br>FLAT DISP./CRT SWITCH | O | 1 | 1 |
| AFL<br>FLAT DISP. | O | 1 | 1 |
| DSC<br>LCD/ELD SWITCH | O | 1 | O |

DISPLAY CONTROLLER

BACKGROUND OF THE INVENTION

1. Field of the Invention

The present invention relates to a display controller suitable for use, for example, in relatively small computer systems.

2. Description of the Related Art

Recently, inexpensive microprocessors, peripheral control large scale integrated circuits (LSIs), and memory LSIs have become available by virtue of remarkable advances in semiconductor technologies. Hence, a suitable combination of these components can be combined to form a relatively high performance computer system.

A display controller is a typical of peripheral LSI used in a computer system. The display system forms the nucleus of a man-machine interface and provides the interface between a microprocessor (CPU) and a display unit such as a cathode ray tube (CRT), a liquid crystal display (LCD), an electroluminescent display (ELD), or a plasma display panel (PDP). The display controller controls a video memory and its timing in accordance with the contents of a program.

A display controller adapted to switch the display unit from CRT to PDP or from PDP to CRT for image display and a data processing system with such a display controller are described in U.S. patent application Ser. Nos. 207,790; 207,986; 208,044; and 208,130; filed on Jun. 17, 1988, on behalf of inventor Hideki Zenda and assigned to the same assignee as the present invention. The arrangements and operations of the display controller and the data processing system described in the applications are incorporated herein by reference.

When the display unit is switched from CRT to PDP or from PDP to CRT by the display controller as described in the above-noted applications, an NMI interruption signal is generated and communicated to the microprocessor. The CPU executes the basic input/output system (BIOS) in response to the NMI interruption signal and, thus, display parameters for the CRT or PDP are set in an I/O register (see the U.S. patent application Ser. No. 208,130).

Such a transfer scheme for display parameters involves the execution of the BIOS, which increases the burden imposed on firmware. In addition, such a scheme is generally incompatible with systems that do not make use of an NMI interruption signal.

SUMMARY OF THE INVENTION

It is accordingly an object of the present invention to provide an image display system including a display controller for switching between two or more display units for displaying images, wherein the burden on the firmware can be reduced in switching between the display units.

To achieve this and other objects, an image display system according to the present invention comprises:

CRT display means including a CRT unit for displaying images;

flat panel display means (LCD) including a flat type of display unit for displaying images;

image memory means for storing image data;

CPU means for executing an application program to write image data into the image memory means;

keyboard means for entering a command for specifying switching between two of the display means to produce a predetermined change signal;

system bus means coupled to the image memory means, the CPU means and the keyboard means for transmitting data;

parameter hold means for holding plural sets of display parameters, each set of display parameters specifying a display state of the CRT display means and the flat panel display means;

display state specifying means for holding the display parameters for specifying a display state of the display means in operation;

parameter path means provided independently of the system bus means and coupled to the keyboard means for transferring the display parameters from the parameter hold means to display state specifying means;

change signal transmitting means provided independently of the system bus means and coupled to the keyboard means for transmitting the change signal;

transfer control means coupled to the change signal transmitting means and responsive to the change signal for transferring the display parameters for display means to be newly operated from the parameter hold means to the display state specifying means via the parameter path means; and control means for displaying an image defined by the image data on the CRT display means or the flat panel display means in accordance with the display parameters stored in the display state specifying means.

According to the arrangement described above, the transfer control means can perform the switching operation independently of the control operation of the CPU without issuing an interrupt signal to the CPU. Accordingly, the burden imposed on firmware can be alleviated and the display units can be switched for use even in a system which does not make use of an NMI interruption signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Reference will now be made in detail to the presently preferred embodiments of the invention as illustrated in the accompanying drawings, in which like reference characters designate like or corresponding parts throughout the several drawings.

Figure 1:
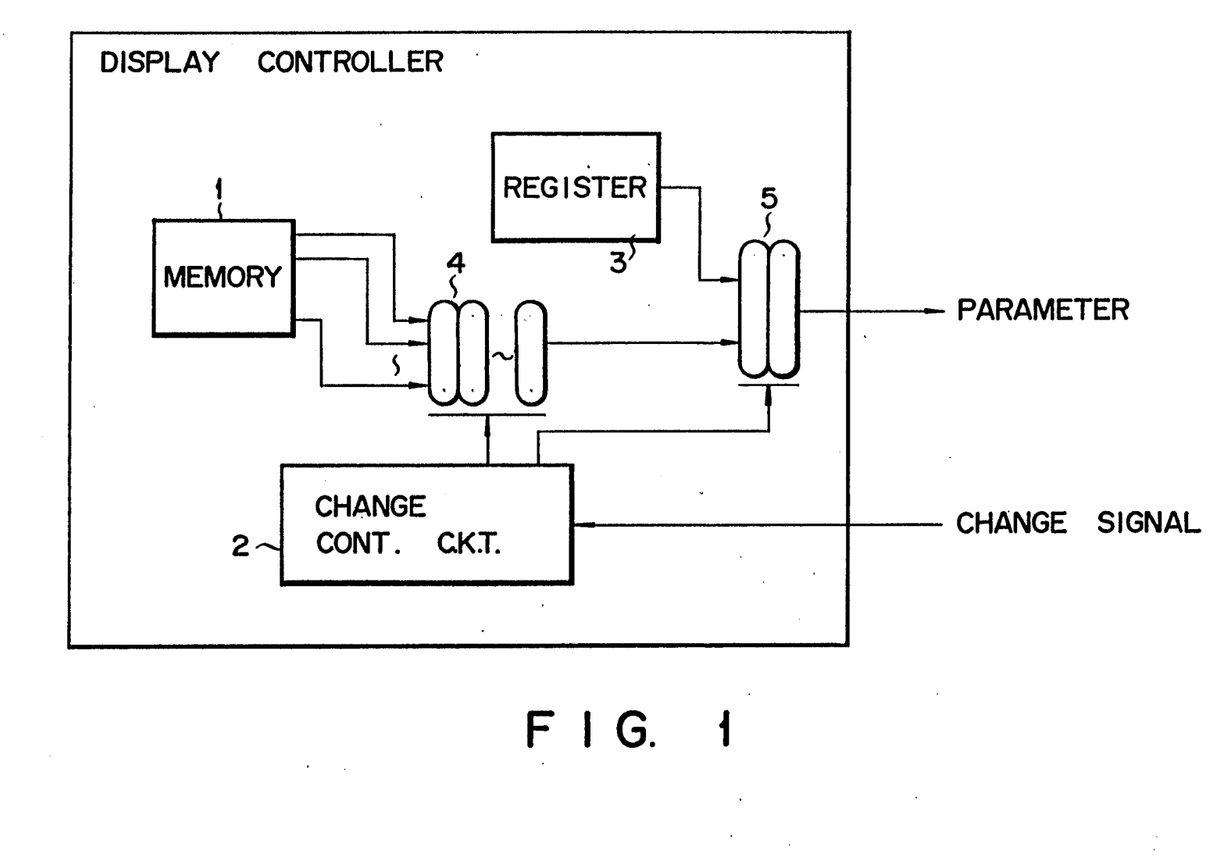
FIG. 1 is a block diagram of a display controller according to an embodiment of the invention.

FIG. 1 shows a display controller according to an embodiment of the invention in which only portions relating to the present invention are shown. The display controller includes a memory 1 for storing and setting parameters for a CRT, an ELD, and an LCD. Memory 1 includes a plurality of registers or a random access memory (RAM), and it is connected to a CPU which is not shown. The contents of memory 1 can be repeatedly written to by the CPU. The display controller also includes change control circuit 2 which includes logic circuits, and receives a change signal from other portions of the display controller. Change control circuit 2 responds to the change signal by applying select control signals to selectors 4 and 5. A register 3 holds default (fixed) display parameters (referred to hereinafter as fixed values). An output of selector 5 (a display parameter or fixed value selected by selectors 4 and 5) is applied to and stored in an I/O memory (not shown).

The display controller displays images on a display unit (not shown) in accordance with the display parameters set in the I/O memory.

The operation of the first embodiment will now be described. When the operator wishes to switch the display units, the operator performs a predetermined key operation with the result that the change signal is applied to change control circuit 2. In response to the change signal change control circuit 2 applies select control signals to selectors 4 and 5 without issuing an interrupt signal to the CPU. In response to the select control signal, selectors 4 and 5 read a set of display parameters or fixed values for a display unit to which image data are to be switched, that is, a display unit which is to be newly designated and operated, from memory 1 or register 3. The read parameters or fixed values are stored in the I/O memory. The display controller displays images on the newly designated display unit to which image data have been switched.

The display parameters (parameter values) stored in memory 1 can be replaced or rewritten by the CPU when necessary. Register 3 stores default (fixed) display parameters for a display unit, e.g., a set of fixed display parameters for the initial screen of the system shown in FIG. 1.

In such an arrangement, after a power supply is activated to supply power, the initial screen defined by the display parameters stored in register 3 is displayed on a display unit (e.g., CRT), and the display parameters stored in memory 1 can then be set in the I/O memory. The image data can then be switched to a desired display unit.

According to such an arrangement as described above, a display controller is provided which can switch between display units, alleviate the burden imposed on the firmware (BIOS), and accommodate a system that does not use an NMI interrupt signal. Hence, a flexible system can be built.

Next, a data processing system with a display controller according to a second embodiment of the invention will be described with reference to FIG. 2.

Figure 2:
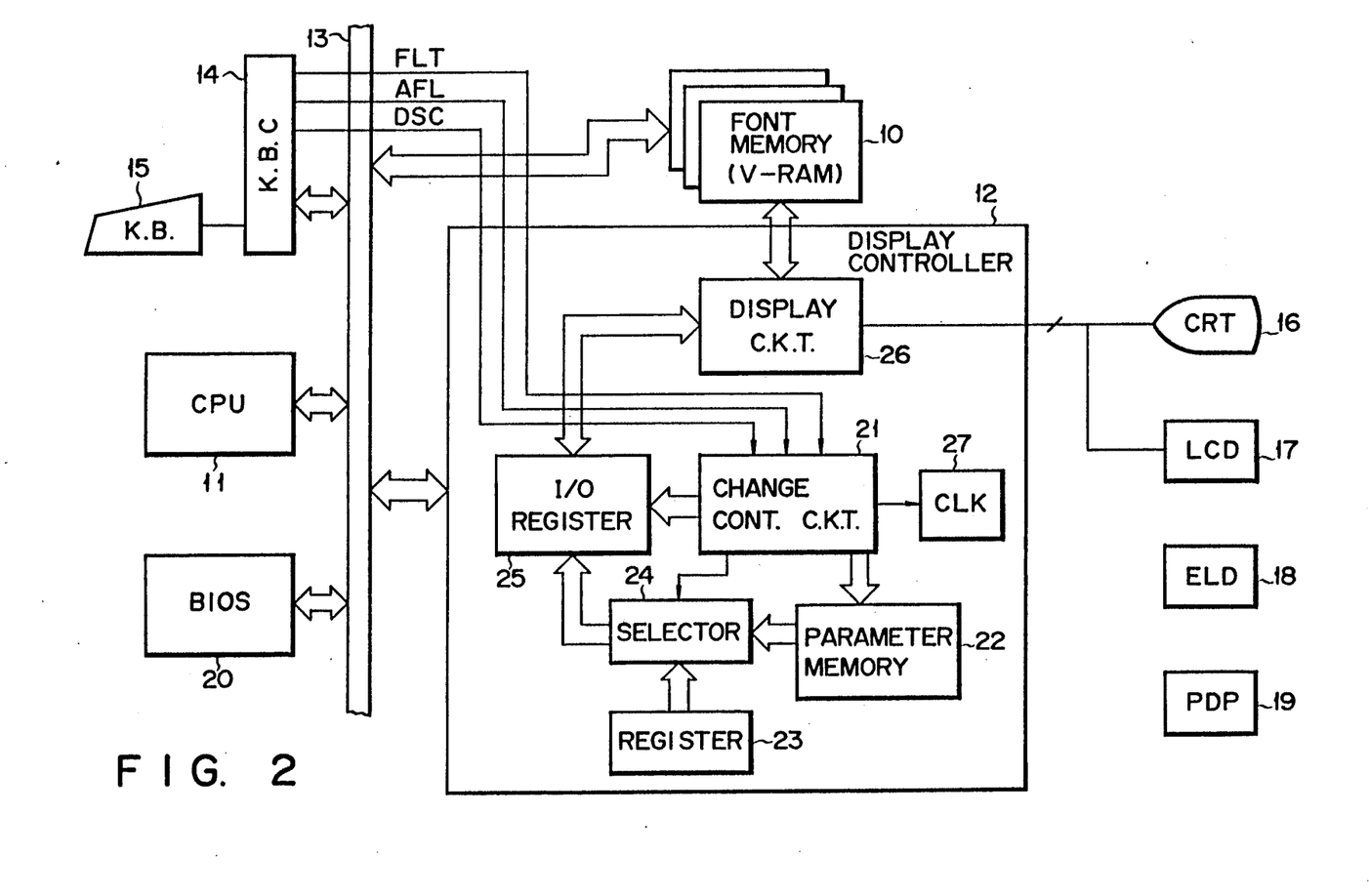
FIGS. 2 and 7 are block diagrams of image display systems with display controllers according to other embodiments of the invention.

In FIG. 2, a CPU 11 and a display controller 12 are interconnected by a bus 13. Bus 13 comprises an address bus for transmitting address data, a data bus for transmitting data, and a control bus for transmitting control signals. A keyboard controller 14 is connected to bus 13. A keyboard 15 is connected to keyboard controller 14. A font memory (image memory) 10 for storing image data is connected to display controller 12 and 13. Display controller 12 is connected to display units, for example, as described above. In FIG. 2, a cathode ray tube (CRT) 16, a liquid crystal display (LCD) 17, an electroluminescent display (ELD) 18, and a plasma display panel (PDP) 19 are shown as display units. LCD 17, ELD 18, and PDP 19 are each of a flat type. Of these display units, CRT 16 and LCD 17 are connected to display controller 12 as shown. A BIOS-ROM 20 which stores the BIOS is connected to bus 13. In this embodiment BIOS-ROM 20 stores no display parameters.

Display controller 12 comprises a change control circuit 21, a parameter memory 22, a register 23, a selector 24, an I/O register 25, a display circuit 26, and a clock generator 27. Change control circuit 21 is supplied with change signals (FLT, AFL, and DSC) from keyboard controller 14 and controls the switching operation of display units in response to the signals FLT, AFL, and DSC.

Figure 3:
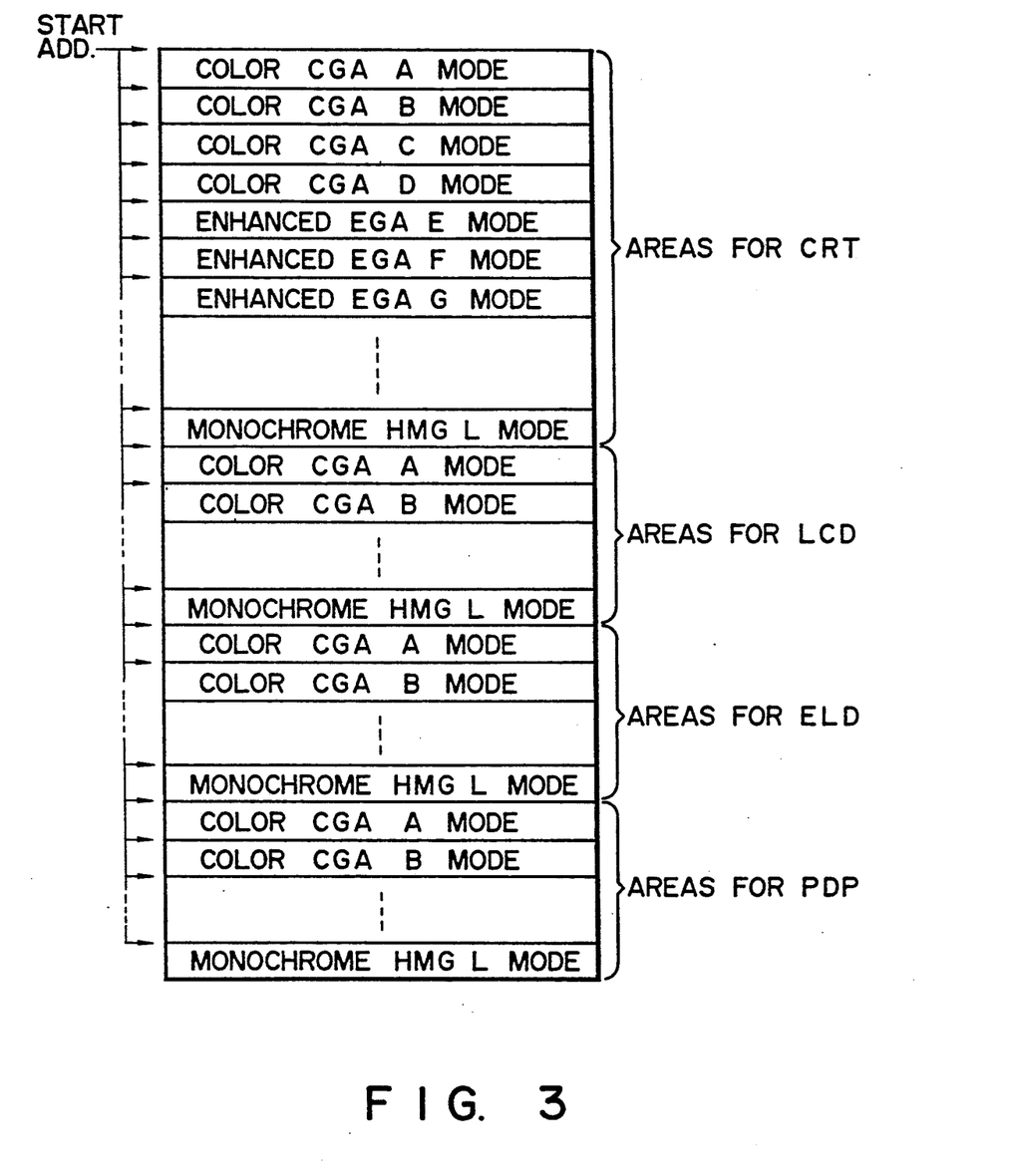
FIG. 3 shows a memory map of the parameter memory shown in FIG. 2.

Parameter memory 22 is addressed by change control circuit 21 to store display parameters. As shown in FIG. 3, parameter memory 22 stores a set of display parameters for each of the display modes of the display units. For instance, parameter memory 22 stores a set of display parameters for each of A, B, C, and D modes of COLOR CGA for CRT 16; each of E, F, G, and H modes of ENHANCED EGA; I mode of MONOCHROME MDA; J and K modes of MONOCHROME EGA; and L mode of MONOCHROME EMG. LCD 17, ELD 18, and PDP 19 each have display modes corresponding to the display modes of CRT 16. Parameter memory 22 stores a set of display parameters for each of the modes of the LCD, ELD, and PDP, as shown in FIG. 3. The display parameters may contain data indicative of the number of characters per line, the number of lines displayed on the screen, the number of dots per line, the number of dot lines on the screen, the distinction between color and monochrome displays, a type of font, and a color or gradation set in a pallet register in I/O register 25. Parameter memory 22 includes a RAM, for example, and may be subjected to rewriting or parameter modification by CPU 11 as the need arises.

Fixed display parameters are set in register 23. The fixed display parameters may include a display parameter for regulating the initial state of each display unit.

Register 23 need not merely include a storage register, but may include gates (e.g., gate arrays) representing the fixed values, a ROM storing the fixed values, a register, and the like.

Output data of parameter memory 22 and register 23 are communicated to selector 24. Selector 24 responds to a select control signal from change control circuit 21 to select the appropriate output data from either the parameter memory 22 or the register 23. Selector 24 applies the selected display parameters to I/O register 25 via a bus that is independent of system bus 13.

I/O register 25 receives a write control signal and address data from change control circuit 21. I/O register 25 stores the output data from selector 24 in its storage area designated by change control circuit 21.

Display circuit 26 is connected to font memory 10, I/O register 25, CRT 16, and LCD 17. Display circuit 26 addresses font memory 10 to read stored data therefrom. Display circuit 26 causes images to be displayed on CRT 16 or LCD 17 in accordance with display parameters stored in I/O register 25.

Clock generator 27 changes the frequency of its output pulses in response to a control signal from change control circuit 21.

Next, the operation of the data processing/image display system of FIG. 2 will be described. First the image display operation will be outlined. CPU 11 executes application software to store image data in font memory 10. CPU 11 stores images in font memory 10 in the form of code data, for example. Display circuit 26 addresses font memory 10 to sequentially read the code data from font memory 10. Display circuit 26 expands, on a bit map, the code data read from the font memory in accordance with the number of characters per line and the number of lines to be displayed on the screen which are specified by the display parameters set in I/O register 25. Moreover, display circuit 26 displays the expanded data on the selected CRT 16 or LCD 17 in a color and gradation level specified by the display parameters stored in I/O register 25.

CPU 11 may write graphic data into font memory 10 in the form of a bit map. In this case, display circuit 26 scans font memory 10 and reads the graphic data from font memory 10. Display circuit 26 addresses the pallet register in the I/O register 25 to display an image on the selected CRT 16 or LCD 17 in a color or gradation level specified by the data held in the register. Display circuit 26 also displays a cursor of a shape specified by the display parameters held in I/O register 25.

The operation of switching between the display units will now be described. For switching between the display units, the operator may push a predetermined key of keyboard 15. In response to the key designation, keyboard controller 14 issues signals FLT, AFL, and DSC. These signals are applied to change control circuit 21 via a bus that is independent of system bus 13.

Figure 4:
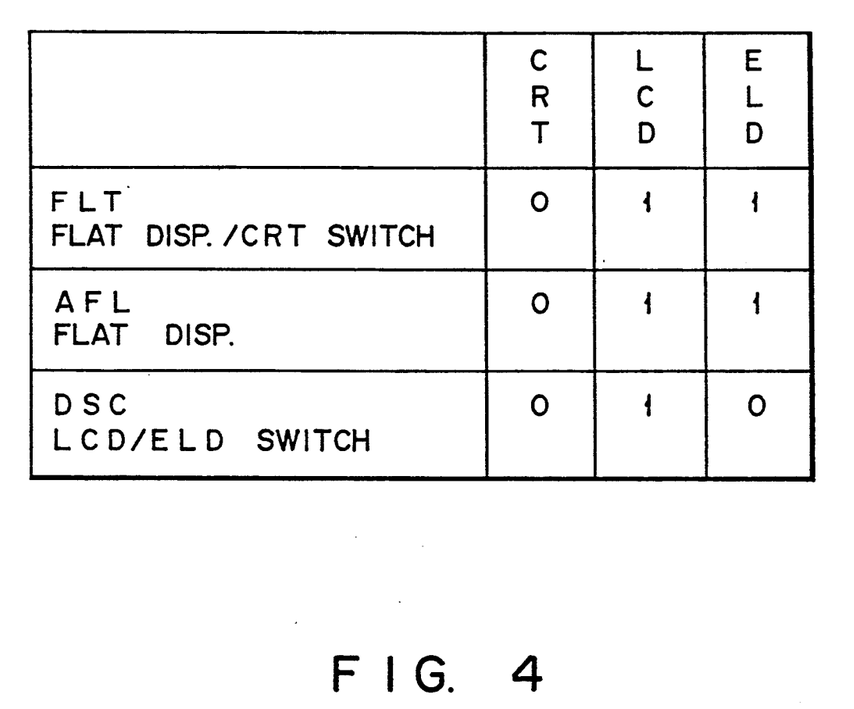
FIG. 4 is a diagram useful for explaining signals used in the image display system shown in FIG. 2.

The contents of signals FLT, AFL, and DSC are shown in FIG. 4 which shows, by way of example, a case in which CRT 16, LCD 17, and ELD 18 are used as the display units. As shown, signal FLT is used to distinguish between the CRT and the flat display unit (LCD or ELD). Signal AFL is activated when a flat display unit is selected. Signal DSC is used to distinguish between the LCD and the ELD. The system of this embodiment is based on the CRT. Thus, when the signals are all "0", the CRT is selected as shown in FIG. 4. When the signals are all "1", the LCD is selected, and when signals FLT and AFL are "1" and signal DSC is "0", the ELD is selected.

In response to the mode change signal, change control circuit 21 performs the switching operation, which will be described with reference to FIGS. 5 and 6.

When change control circuit 21 receives display switching signals FLT, AFL, and DSC (step S1), a signal detect portion 31 of change control circuit 21 checks the contents of the switching operation (step S2). A clock switch portion 32 responds to the result of the checking by detect portion 31 by issuing a signal instructing the switching of the clock frequency (step S3). In response to the frequency switch signal, clock generator 27 outputs a clock signal of 14 MHz when the CRT is selected or a clock signal of 18 MHz when the LCD is selected. The clock signal output from clock generator 27 is applied to various portions of the system, for example, the CRT, the LCD, and the I/O register.

A memory 37 of change control circuit 21 stores the operation mode of the display unit during operation. Upon receipt of a change signal, an address generator 33 of change control circuit 21 checks the contents of memory 37 to determine the corresponding display mode of the display unit to which operations are to be switched and generates a start address corresponding to an area of parameter memory 22 which stores display parameters for the corresponding display mode. For example, when the change signal specifying a switch from the CRT to the LCD is received when the CRT 16 is operating in the COLOR CGA A mode, address generator 33 checks the contents of memory 37 and generates the start address corresponding to the area storing the display parameters for A mode of COLOR CGA of the LCD. The contents of memory 37 are appropriately updated when the display mode is switched.

Memory read portion 34 of change control circuit 21 reads stored data from the designated address of memory 22.

Register read portion 38 of change control circuit 21 outputs a read enable signal RE and reads the parameters stored in register 23. A selector control portion 35 controls selector 24 to select and apply either the display parameters from parameter memory 22 or the fixed display parameters from register 23 to I/O register 25 via a path different from system bus 13. For example, when the initial screen of this system is displayed, selector control portion 35 causes selector 24 to select the fixed display parameters stored in register 23. When another screen is displayed, selector control portion 35 causes selector 24 to select the display parameters read out from memory 22. Memory address generator 33 outputs an address for I/O register 25 as well. An I/O write portion 36 writes the display parameters supplied from selector 24 into that position of I/O register 25 which is specified by the address from address generator 33. Upon termination of reading and writing for one display parameter, change control circuit 21 generates the next address to repeat the above reading and writing operations. The above operations are repeated until all the display parameters for the selected display mode are stored in I/O register 25.

After a series of operations described above are terminated, an image stored in font memory 10 is displayed in accordance with the display parameters newly stored in I/O register 25.

In this embodiment, the change control signal is applied to display controller 12 via a path different from system bus 13, and display controller 12 transfers the display parameters to I/O register 25 via a path different from system bus 13 without issuing an interrupt signal to CPU 11. Accordingly, display controller 12 can set display parameters in the I/O register independent of the operation of CPU 11.

According to this embodiment, when the display units are switched, the display parameters for a mode corresponding to the current display mode are automatically loaded into I/O register 25 by operating keyboard 15. Thus, even if the display unit is switched from CRT 16 to LCD 17 at a time when the CRT displays an image in 40 characters ×25 rows, the LCD will display the image in 40 characters ×25 rows.

Figure 7:
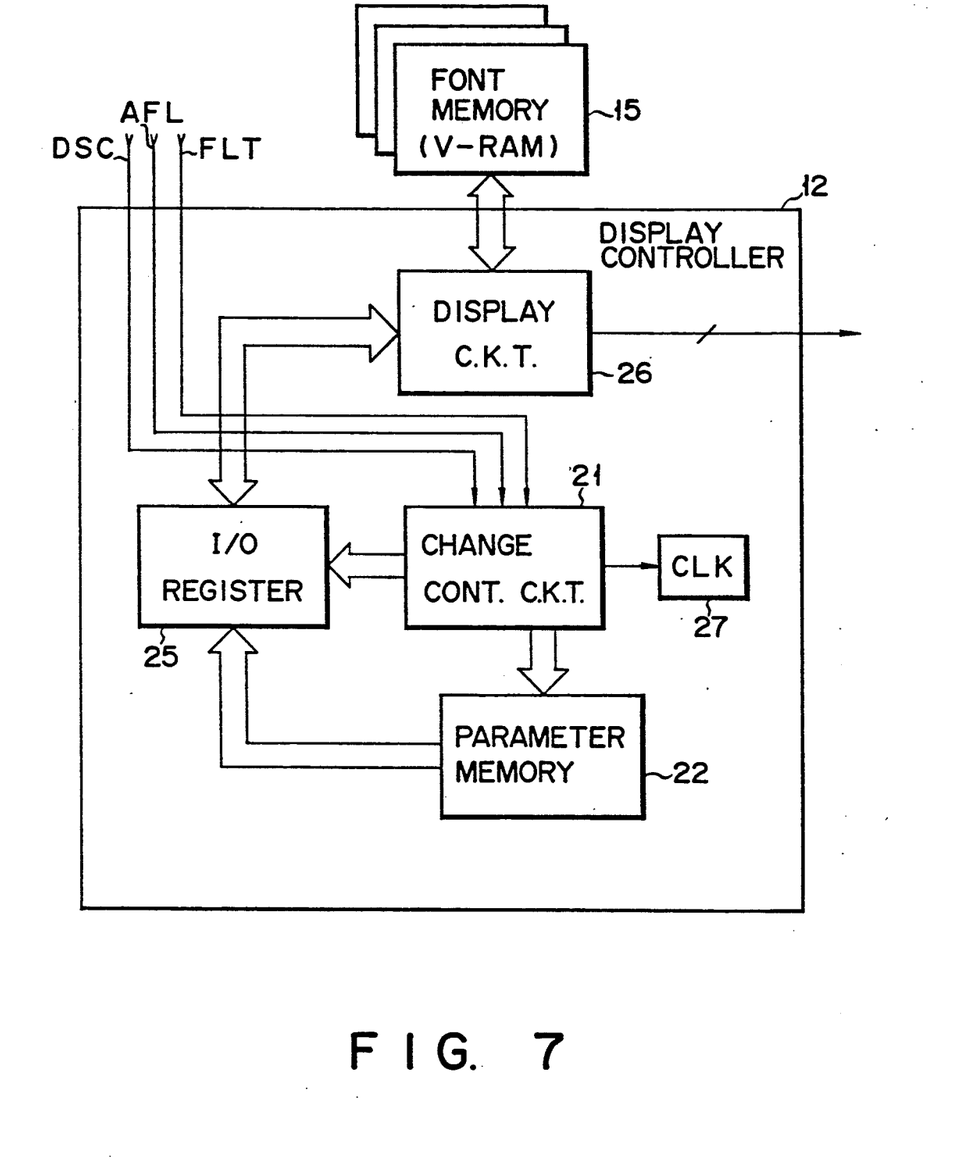

In the above embodiment, the fixed display parameters are stored in register 23 and updatable display parameters are stored in memory 22. The present invention is not, however, limited to this embodiment. As illustrated in FIG. 7, both the fixed display parameters and updatable display parameters may be stored in memory 22 only. In the embodiment shown in FIG. 7, all the display parameters are stored in memory 22 having a backup function. Change control circuit 21 controls an address supplied to memory 22 to read out a set of display parameters stored in memory 22. However, change control circuit 21 does not rewrite the fixed display parameters stored in memory 22. With this arrangement, neither register 23 nor selector 24 is required and, accordingly, display controller 12 can be of simple construction.

The present invention is not limited to the embodiments described above, and various modifications are possible. For example, although the fixed values are stored in register 23 in the embodiment of FIG. 2, they may be stored in parameter memory 22 instead. In this case, if address generator 33 of change control circuit 21 properly controls its output address, the display parameters can be stored in I/O register 25 without provision of selector 24. A number of practical arrangements for I/O register 25 are known.

In the above embodiments, an operator initiates the switching between display units by keyboard 15. Alternatively, another entry means may be used. Moreover, the mode change signal is applied from keyboard controller 14 to change control circuit 21. Alternatively, the change control signal may be applied from keyboard controller 14 to change control circuit 21 via bus 13. In addition, the change control signal may be applied to change control circuit 21 by the use of software to switch between the display units.

Figure 5:
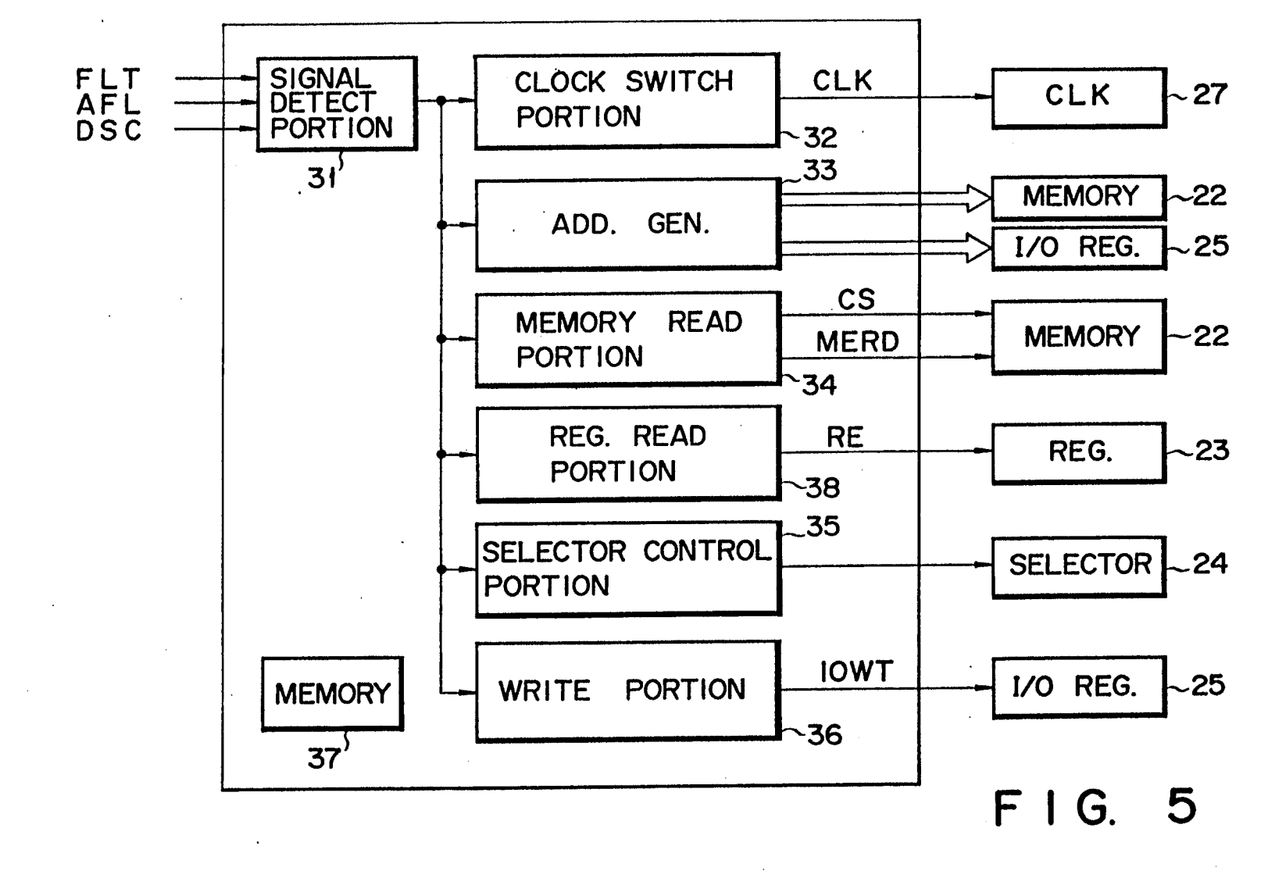
FIG. 5 is a block diagram of the change control circuit shown in FIG. 2.
Figure 6:
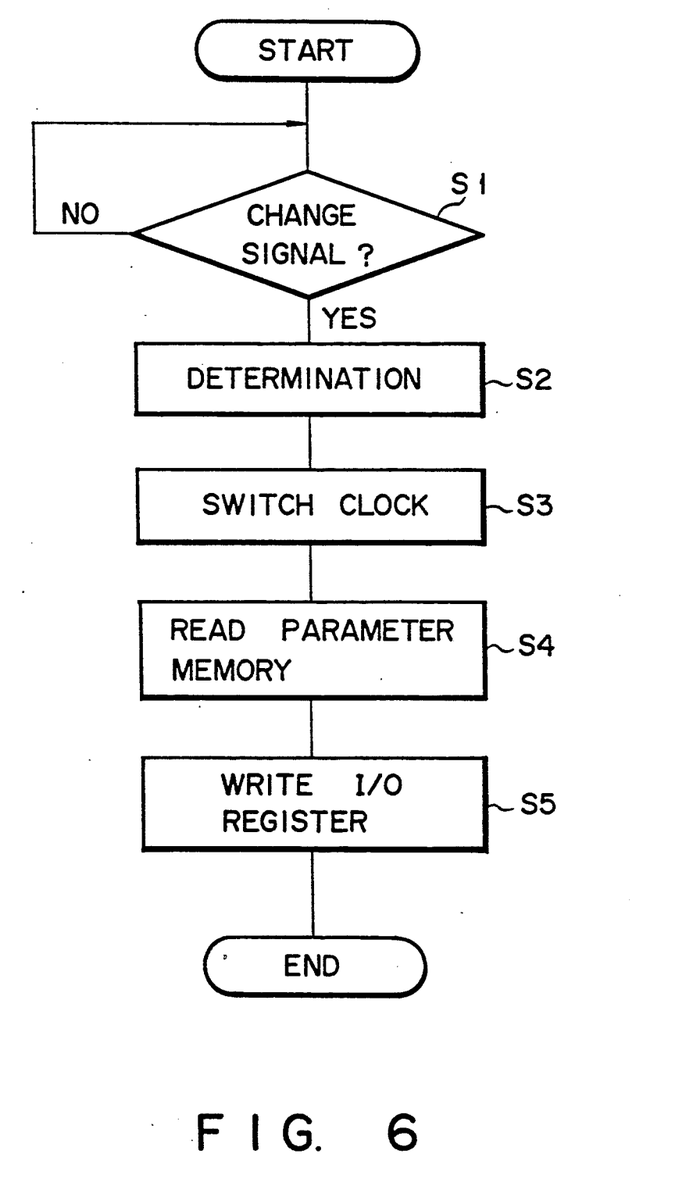
FIG. 6 is a flowchart illustrating the display unit switching operation of the display system shown in FIG. 2.

In the embodiment shown in FIG. 5, the mode data stored in memory 37 is used in addressing parameter memory 22. Alternatively, address generator 33 may receive the current display mode from the CPU to determine a corresponding start address.

According to the second embodiment, display controller 12 can perform the switching operation independent of the control operation of CPU 11 without issuing an interrupt signal to the CPU. Accordingly, the burden imposed on firmware can be alleviated and the display units can be switched for use even in a system which does not make use of NMI.

Additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. An image display system for displaying image data in accordance with an application program, said system comprising:

cathode ray tube display means including a cathode ray tube unit having a plurality of display modes for displaying images corresponding to the image data;

flat panel display means including a flat panel display unit having a plurality of display modes for displaying images corresponding to the image data;

image memory means for storing the image data;

processing means for executing the application program to write the image data into said image memory means;

keyboard means for entering a command to instruct switching from a currently operating one of said cathode ray tube display means and said flat panel display means to a designated one of said cathode ray tube means and said flat panel display means and for producing a predetermined change signal indicative of the command;

system bus means coupled to said image memory means, to said processing means, and to said keyboard means for transmitting the image data;

parameter storing means for storing plural sets of display parameters, each set containing information on screen resolution, color or monochrome mode, font-type, and gradation set;

I/O register means for storing the set of display parameters for the currently operating display means;

parameter path means provided independently of said system bus means and coupled to said parameter storing means and to said I/O register means for transferring the display parameters from said parameters storing means to said I/O register means;

change signal transmitting means provided independently of said system bus means and coupled to said keyboard means for transmitting the change signal;

non-interrupt transfer control means coupled to said change signal transmitting means and responsive to the change signal for transferring selected display parameters for the designated display means from said parameter storing means to said I/O register means via said parameter path means;

display circuit means for causing an image to be displayed on the designated display means in accordance with the image data stored in said image memory means and the selected set of display parameters stored in said I/O register means, said designated display means thereby becoming the currently operating display means; and said non-interrupt transfer control means including means responsive to the change signal for identifying a current display mode of the currently operating display means, for selecting the selected display parameters for a corresponding display mode for the designated display means, and for transferring the selected display parameters to said I/O register means without interacting with said processing means.

2. The system according to claim 1, wherein said transfer control means includes means for transferring the selected display parameters in response to receipt of the change signal, independently of said processing means and without issuing an interrupt signal to said processing means.

3. The system according to claim 1, wherein said system operates according to clock signals, wherein said system further includes display clock means for generating clock signals, and wherein said transfer control means comprises means for switching the frequency of said clock signals, means for reading the selected display parameters from said parameter storing means, and means for writing the display parameters read from said parameter storing means into said I/O register means.

4. The system according to claim 1, wherein said parameter storing means comprises updatable memory means coupled to said processing means for storing display parameters which can be updated by said processing means, and fixed parameter storing means for holding fixed display parameters.

5. The system according to claim 4, wherein said system operates according to clock signals, wherein said system further includes display clock means for generating clock signals of specified frequency, and wherein said transfer control means comprises,
   means for selecting the frequency of said clock signals,
   first reading means for addressing said updatable memory means and for reading the selected display parameters from said updatable memory means,
   second reading means for addressing said fixed parameter storing means and for reading the selected display parameters from said storing means,
   selector means for selecting and transferring the selected display parameters from said first and said second reading means to said I/O register means via said parameter path means, and
   writing means for writing the selected display parameters from said selector means into said I/O register means.

6. An image display system for displaying image data in accordance with an application program, said system comprising:
   first display means for displaying images corresponding to the image data;
   second display means for displaying images corresponding to the image data;
   image memory means for storing the image data;
   processing means coupled to said image memory means for executing the application program to write the image data into said image memory means;
   switching instruction means for producing a change signal in response to an instruction from an operator to switch from a currently operating one of said first and said second display means to the designated other one of said first and said second display means;
   parameter storing means for storing plural sets of display parameters, each set containing information on screen resolution, color or monochrome mode, font-type, and gradation set;
   register means for storing the display parameters for the currently operating display means;
   non-interrupt transfer control means coupled to said switching instruction means, to said parameter storing means, and to said register means and responsive to the change signal for transferring selected display parameters for the designated display means from said parameter storing means to said register means and for storing the selected display parameters in said register means without interacting with said processing means; and
   control means coupled to said register means, to said image memory means, to said first display means, and to said second display means for causing an image to be displayed on said designated display means in accordance with the image data stored in said image memory means and the selected display parameters stored in said register means.

7. The system according to claim 6, wherein said transfer control means includes means for transferring the selected display parameters independently of said processing means.

8. The system according to claim 6, wherein:
   said first and said second display means each includes at least one of a cathode ray tube unit, a liquid crystal display unit, an electroluminescent display unit, and a plasma display panel unit;
   each of said first and said second display means has a plurality of display modes; and
   said parameter storing means store a plurality of sets of parameters, each set corresponding to one of the display modes, said switching instruction means instructs said transfer control means to switch between said first and said second display means independently of said processing means.

9. The system according to claim 8, wherein:
   said transfer control means includes means for selecting a set of display parameters for one of the display modes from among the plurality of sets of display parameters stored in said parameter storing means, and for transferring the selected set of display parameters to said register means.

10. The system according to claim 6, wherein said system operates according to claim signals, wherein said system further includes display clock means for generating clock signals of a specified frequency, and wherein
    said parameter storing means comprise updatable memory means for storing updatable display parameters and fixed parameter storing means for storing fixed display parameters, and
    said non-interrupt transfer control means comprises means for switching the frequency of said clock signals, first readout means for addressing said updatable memory means to read selected updatable display parameters from said updatable memory means, second readout means for addressing said fixed parameter storing means to read selected fixed display parameters from said fixed parameter storing means, selector means for selecting and reading the selected display parameters from one of said first readout means and said second readout means, and means for writing the selected display parameters from said selector means into said register means without interacting with said processing means.

11. The system according to claim 6, wherein said switching instruction means includes a keyboard.

12. The system according to claim 6, wherein said display parameters are values predetermined by the system.

13. A display control circuit coupled to a plurality of display units and to a central processing unit for switching from a currently operating one of the display units to a designated one of the display units, said display control circuit comprising:
    parameter storing means for storing a plurality of sets of display parameters for said display units;
    I/O register means for storing the set of display parameters for said currently operating display unit; and
    non-interrupt transfer control means, responsive to a change signal to switch from said currently operating display unit to said designated display unit, for transferring a selected set of the display parameters for said designated display unit from said parameter storing means to said I/O register means without interacting with said central processing unit, said transfer control means operating independently of said central processing unit.

14. The display control circuit according to claim 13, wherein said transfer control means includes means for transferring the selected set of display parameters independently of the operation of said central processing unit.

15. The display control circuit according to claim 13, further comprising means for controlling a display operation of said designated display unit in accordance with the selected display parameters stored in said display state specifying means.

16. The display control circuit according to claim 13, wherein:
    each of said currently operating display unit and said designated display unit comprise at least one of a cathode ray tube display unit, a liquid crystal display unit, an electroluminescent display unit, and a plasma display unit;
    said currently operating display unit and said designated display unit have corresponding display modes; and
    said parameter storing means stores a set of the display parameters for the display modes of each said currently operating display unit and said designated display unit.

17. The display control circuit according to claim 13, wherein said transfer control means includes means for selecting the set of display parameters corresponding to the current mode of said currently operating display unit, and means for transferring the selected set of display parameters to said parameter storing means.

18. The display control circuit according to claim 13, wherein said system operates according to clock signals, wherein said system further includes display clock means for generating clock signals of a specified frequency, and wherein,
    said parameter storing means comprises updatable memory means for storing updatable display parameters and fixed parameter storing means for storing fixed display parameters, and
    said non-interrupt transfer control means comprises means responsive to the change signal for switching the frequency of said clock signals without interacting with said central processing unit, first readout means responsive to the change signal for addressing said updatable memory means to read the display parameters from said updatable memory means, second readout means for addressing said fixed parameter storing means to read the display parameters from said fixed parameter storing means, selector means for selecting and reading the display parameters from said first and said second readout means, and means for addressing said I/O register means to write the display parameters from said selector means into said I/O register means.

19. The display control circuit according to claim 13, further comprising supplying means for supplying said change signal to said transfer control means in response to an instruction of an operator independently of said central processing unit.

20. The display control circuit according to claim 19, further comprising a system bus connected to said central processing unit, and means provided separate from said system bus for transferring said change signal.

21. The display control circuit according to claim 19, wherein said supplying means includes a keyboard.

22. The display control circuit according to claim 11, wherein said display parameters are values determined by the display control circuit.

* * * * *

UNITED STATES PATENT AND TRADEMARK OFFICE
CERTIFICATE OF CORRECTION

PATENT NO. : 5,138,305
DATED : August 11, 1992
INVENTOR(S) : Yuichi Tomiyasu It is certified that error appears in the above-identified patent and that said Letters Patent is hereby corrected as shown below:

Claim 1, column 10, line 26, change "claim" to --clock--.

Signed and Sealed this

Twenty-first Day of June, 1994

*Attest:*

BRUCE LEHMAN

*Attesting Officer* — Commissioner of Patents and Trademarks